SIGNAL SEEKING RECEIVER

Filed May 17, 1956

INVENTORS
FRANKLIN E. TAYLOR
AND CARL AKRELL
BY
Mason, Kolehmainen, Rathburn & Wyss
ATTORNEYS 2,885,546

SIGNAL SEEKING RECEIVER

Franklin E. Taylor, Buffalo, and Carl Akrell, Snyder, N.Y., assignors to Sylvania Electric Products Inc., a corporation of Massachusetts Application May 17, 1956, Serial No. 585,446

2 Claims. (Cl. 250—20)

The present invention relates to signal seeking receivers, more particularly to improved intelligence circuits for use therein, and the invention has for an object the provision of a new and improved intelligence circuit which enables scanning of the frequency spectrum in opposite directions and which further enables the use of relatively inexpensive driving apparatus for the tuning elements of the receiver while providing both accuracy of tuning and reliability of operation.

Signal seeking receivers heretofore proposed may be considered to comprise four basic sections, these being the receiver section, which includes an adjustable tuner, the intelligence section, the control section and the motor driving section. Briefly, considering the individual function of each of these sections, the receiver section reproduces the information which is contained in a selected one of a plurality of modulated waves received by the antenna of the receiver; the intelligence section produces a signal which is indicative of the condition of tuning of the receiver, i.e., indicative of whether or not the receiver is tuned so as to select from the antenna a received signal voltage which is suitable for reproduction; the control circuit which is responsive to the intelligence signal for selectively supplying energy to a motive means; and the driving section which includes the motive means and which continuously moves the tuning elements in the reeciver tuner during the period that energy is supplied through the control section to the motive means.

When the signal seeking receiver is actuated so as to initiate a tuning of the receiver by signal seeking, the control section causes an energization of the driving section which continuously adjusts the tuning elements in the receiver thereby to scan the frequencies in the tuning range. At the time during this scanning operation that the receiver becomes tuned so as to select from the antenna a signal which is of sufficient strength for satisfactory reproduction, a signal representative of this fact is supplied from the intelligence section to the control section thereby to deenergize the motive means in the tuning section. Movement of the tuning elements is thus terminated and the receiver remains tuned to the signal in question, which signal is thereby reproduced by the receiver.

While the advantageous characteristics of signal seeking receivers make them suitable for many uses, they find particular application in automobiles since this use enables the operator of the automobile readily and accurately to adjust the tuning condition of the receiver without removing his eyes from the road. Because it is both convenient and economical to energize an automobile radio receiver from the automobile battery and since the output voltage of such batteries vary by as much as 40%, it is important that those circuits which control the tuning condition of the receiver be relatively nonresponsive to wide variations in the voltage level of the energizing source. Also, in order to enable rapid tuning of the receiver so that the attention of the operator need be distracted for only a short period of time, it is desirable that the frequency spectrum be scanned in both an up and a down direction. Additionally, two-way scanning is particularly desirable for operation in areas where the preferred stations are grouped at one end of the band. Two-way scanning, under these conditions, makes it possible to pass by one or more of the stations while searching for a desired program and still go back to one of these stations previously passed by without operating the receiver over the complete band. The receiver merely goes to the end of the band and starts seeking in the return direction.

Since the cost of the additional elements which must be provided to convert a standard broadcast receiver into a signal seeking receiver is substantial, the cost of each such element should be reduced as much as possible. Therefore, it is desirable that relatively inexpensive motive means for positioning the tuning elements in the receiver be employed so that the over-all cost of the receiver is reduced. With many of the prior art type intelligence circuits, the output signal which is indicative of the fact that the receiver is tuned to a reproducible signal is produced only when the receiver is tuned to the carrier frequency whereby it becomes necessary that the driving equipment be adapted to come to rest very quickly when such signal is supplied to the control section of the receiver. In accordance with certain prior art arrangements, expensive braking and clutching apparatus are employed to stop the movement of the tuning elements quickly when the intelligence signal occurs.

It is, therefore, another object of the present invention to provide a new and improved intelligence circuit which enables scanning by a signal seeking receiver of the frequency spectrum in two directions.

A further object of the present invention is to provide a new and improved intelligence circuit for use in a signal seeking receiver which enables the use of inexpensive types of tuning element driving apparatus while providing accurate tuning.

Briefly, the above objects are realized in accordance with one aspect of the present invention by the provision of limiting means for limiting the amplitude of at least a portion of the output voltage wave of an intermediate frequency amplifier in the receiver, resonant circuit means including a capacitor and an inductor having a suitable pass band characteristic, means for supplying an output voltage from the limiting means to the resonant circuit means, and control means responsive to the magnitude of a voltage signal developed in the resonant circuit means for controlling the energization of a scanning motor which adjustably positions the tuning elements in the tuned RF circuits of the receiver.

The invention, both as to its organization and method of operation, together with further objects and advantages thereof, will best be understood by reference to the following detailed description taken in connection with the accompanying drawings in which.

Figure 1:
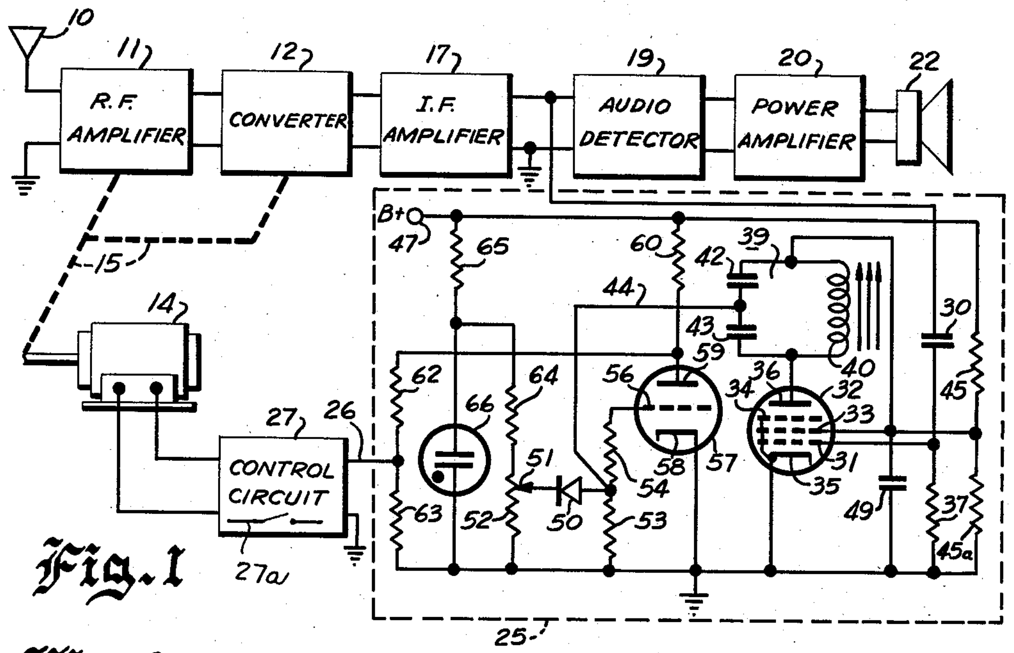
Fig. 1 is a schematic illustration of the intelligence circuit of the present invention as incorporated in a signal seeking receiver.

Referring now to the drawing, and particularly to Fig. 1, an antenna 10 which is suitably adapted to receive signals of frequencies within a particular frequency band such as, for example, the broadcast band, has the output thereof coupled to a conventional RF amplifier 11 which includes one or more adjustably tuned circuits thereby selectively to couple signals contained within a small portion of the frequency band from the antenna 10 to a converter 12. The converter 12 conventionally includes a local oscillator having an adjustable output frequency which is mixed with the amplified RF signal from the RF amplifier 11 to provide an IF signal containing the modulation components of a particular one of the signals received by the antenna 10, these components being modulated on a carrier wave of considerably reduced frequency thereby to permit convenient amplification and suitable selectivity thereof in the receiver. The tuned circuits of the RF amplifier 11 and of the oscillator section of the converter 12 are suitably ganged together as indicated by the dotted lines 15 simultaneously to be repositioned in response to rotation of the output shaft of a single phase D.C. electric motor 14. It will be understood that the adjustably tuned circuits in the RF amplifier 11 and in the converter 12 may be of any suitable type, such, for example, as variable capacitors, variable inductors, or, if expedient, a combination of both.

The modulated IF carrier wave which constitutes the IF signal and which appears at the output of the converter 12 is coupled to an intermediate frequency amplifier stage 17 wherein it is amplified before being coupled to a conventional audio detector 19. In the detector 19 the audio signal is derived from the IF signal and amplified in a suitable audio power amplifier 20 the output of which is utilized to drive a conventional loud-speaker system 22. The loud-speaker system 22 thus reproduces the information which was originally modulated on the carrier wave of the particular modulated radio frequency wave which is selected by the tuned circuits in the RF amplifier 11 and in the converter 12.

The receiver thus far described is entirely conventional, and therefore, its mode of operation need not be described in detail herein. It should be understood that although a D.C. electric motor 14 is shown in the drawing as a means of adjusting the tuned circuits in the RF amplifier 11 and in the converter 12, thereby to select a particular signal from the antenna 10, any suitable means such as, for example, a mechanical spring and spring winding solenoid may be employed for this purpose.

The intelligence circuit of the present invention, which is shown in the area enclosed by the dotted lines 25 produces a signal voltage on the conductor 26 which is indicative of the tuning condition of the receiver. When the receiver is properly tuned so as to select from the antenna 10 a signal of sufficient strength for reproduction by the loud-speaker 22, the control circuit 27 is triggered so as to deenergize the motor 14 thereby to interrupt the continuous adjustment of the tuning elements in the tuned circuits in the RF amplifier 11 and in the converter 12.

When it is desired to tune the receiver to a signal of sufficient strength to be reproduced at the loud-speaker 22 or when it is desired to re-tune the receiver, i.e., to select a station different from that one which is being received, a switch 27*a* in the control circuit 27 is actuated so as initially to energize the scanning motor 14 which causes the tuning elements in the tuned circuits in the RF amplifier 11 and in the converter 12 to be continuously adjusted so that the receiver is progressively tuned through all of the frequencies in the broadcast band. This band is thus scanned until a signal is selected from the antenna 10 which is of sufficient strength to be suitably reproduced by the speaker 22. At this time a stop signal is developed on the conductor 26 at the output of the intelligence circuit 25 thereby to trigger the control circuit 27 so as to deenergize the motor 14. The progressive changing of the resonant frequency of the tuned circuits in the RF amplifier 11 and in the converter 12 is thus terminated so that the receiver remains tuned to that signal which results in the stop signal being developed in the intelligence circuit 25. No further action occurs until the heretofore mentioned switch 27*a* in the control circuit 27 is again actuated, at which time the above described cycle of operation is repeated.

Considering now the intelligence circuit 25 of the present invention, a portion of the amplified intermediate frequency signal which appears at the output of the IF amplifier 17 is suitably coupled through a capacitor 30 to the control electrode 31 of a pentode 32 which additionally has a screen grid 33, a suppressor grid 34, a cathode 35, and an anode 36. The signal which is thus coupled from the IF amplifier 17 to the control electrode 31, and which develops a voltage across a suitable grid leak resistor 37, is amplified in the pentode 32 thereby to develop an amplified signal of identical frequency across a tuned resonant circuit 39, which circuit is connected in the anode circuit of the pentode 32. The tuned resonant circuit 39 comprises a parallel arrangement of an adjustable inductor 40, and a pair of serially connected capacitors 42 and 43. The cathode 35 is connected directly to ground, and the anode 36 is connected through the resonant circuit 39 to the screen electrode 33. The screen electrode 33 and the anode 36 are supplied from the B+ terminal 47 through a resistor divider network comprising resistors 45 and 45*a*. By a proper selection of the parameters of resistors 45 and 45*a*, the pentode 32 is operated as a limiter whereby the output thereof which appears at the anode 36 is of a relatively constant amplitude for input signal levels above a predetermined level. This level is preferably that of the IF signal which must appear at the output of the IF amplifier 17 to produce a satisfactory audio reproduction by the loud-speaker 22. A capacitor 49 connected between the screen electrode 33 and ground acts to bypass radio frequencies.

As is known to those skilled in the art, the IF amplifier of a conventional receiver has a relatively wide frequency passband characteristic such, for example, as of the order of 7 kilocycles. If, therefore, the IF signal is taken off the primary winding of the second IF transformer of the receiver and thereafter is supplied to a limiter, the frequency selectivity characteristic of the combination circuit would be of the form shown in Fig. 3(*a*) provided that the output of the limiter is selected to be aperiodic, this curve being symmetrical with respect to the center frequency of the IF amplifier, which frequency is designated $f_r$ in Fig. 3(*a*). Assuming an aperiodic load, it may be seen by reference to Fig. 3(*a*) that the signal voltage which would appear at the output of the limiter 32 would be constant through a relatively wide range of frequencies symmetrically arranged about the center frequency $f_r$.

Figure 3:
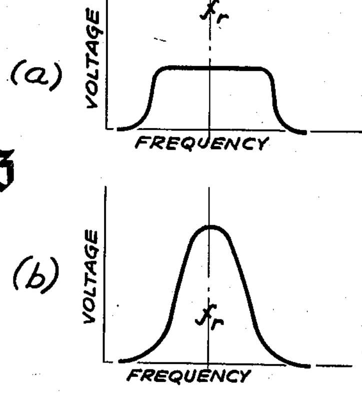
Figs. 3(*a*) and 3(*b*) show waveforms useful in understanding the operation of the circuits shown in Figs. 1 and 2.

The circuit parameters in the resonant circuit 39 are selected such that the tuned circuit 39 is generally more selective than the IF amplifier, the frequency selectivity curve of the resonant circuit 39 being illustrated by the waveform of Fig. 3(*b*). As will be brought out more clearly hereinafter, there are several factors governing selection of the Q of the resonant circuit 39 which may vary with the desired application. As the resonant frequency of the tuned RF circuits of the receiver approaches that of a signal of the desired strength on the antenna 10 the frequency of the intermediate frequency carrier wave approaches the resonant frequency $f_r$ of the IF amplifier 17 and of the resonant circuit 39. Because of the limiting action of the pentode 32, the amplitude of the signal voltage which is supplied to the control electrode 31 as the frequency of the IF carrier approaches the frequency $f_r$ has no effect on the output voltage at the anode 36, since only the impedance of the resonant circuit 39 is determinative of this output voltage. Therefore, the voltage which is developed on the conductor 44 follows the selectivity curve of the resonant circuit 39, which is shown in Fig. 3(*b*).

In order to rectify and amplify the voltage appearing across the resonant circuit 39, the signal on the conductor 44 is rectified in a unidirectional impedance device 50 which is connected between the conductor 44 and an adjustable tap 51 on a resistor 52. The rectified signal thus developed across the resistor 53 is coupled through a resistor 54 to the control grid 56 of a D.C. amplifier tube 57 which is further provided with a cathode 58 and an anode 59, the anode 59 being connected through a suitable anode resistor 60 to the B+ terminal 47. The amplified D.C. signal which thus appears at the anode 59 is coupled through a resistor 62 to an output resistor 63 and is supplied over the conductor 26 to the control circuit 27. It may thus be seen that the use of the two capacitors 42 and 43 serially connected across the inductor 40 enables the coupling of a tapped down voltage signal to the detector 50 without loading the tuned circuit 39.

In order to adjust the level of the voltage which appears on the conductor 26 when a received signal of reproducible strength is selected, the upper terminal of the resistor 52 is connected through a resistor 64 and a resistor 65 to the B+ terminal 47. Therefore, the adjustment of the variable tap 51 on the resistor 52 determines the bias or delay voltage which is provided across the rectifier 50 and, therefore, the amplitude of the signal which must be developed across the resonant circuit 39 in order to provide a signal input for the D.C. amplifier 57.

As discussed hereinbefore, movement of the tuning elements in the RF amplifier and converter does not cease immediately when the "stop" signal is produced by the intelligence circuit and these tuning elements are hence not exactly tuned to the desired signal. This over-run of the tuning elements is relatively fixed since the motor 14 operates at a relatively constant speed throughout the frequency spectrum. Consequently, it is desirable to supply the "stop" signal to the control circuit 27 at a fixed time interval before the receiver is exactly tuned to the selected signal to be reproduced. To this end, the Q of the resonant circuit 39 may be selected and the tap 51 may be adjusted to provide a delay bias voltage for the rectifier 50 so that a "stop" signal sufficient to cause deenergization of the motor 14 is produced on the conductor 26 when the receiver is a predetermined distance from a signal of the desired strength such that when the motor is deenergized the inertia of the tuned circuit elements and of the driving means results in the tuned circuits being exactly tuned to the carrier frequency of the selected signal when they finally come to rest.

In order to insure that the intelligence signal which is developed on the conductor 26 will be of a given magnitude for a particular condition of the tuning of the receiver irrespective of wide variations in the energizing voltage supplied to the B+ terminal 47, a gaseous voltage regulator discharge device 66 is connected between the junction of the resistors 64 and 65 and ground. Therefore, a constant voltage is developed across the resistors 52 and 64 so that a constant bias voltage is developed across the rectifier 50 irrespective of wide changes in the magnitude of the energization voltage therefor. This feature is particularly important in signal seeking receivers which are generally employed in automobiles and are energized from the automobile battery which may have a voltage output varying by as much as 40%.

It is important that the resonant circuit 39 be chosen to have a symmetrical frequency bandpass characteristic with respect to the resonant frequency of the IF amplifier 17. Such a symmetrical bandpass characteristic permits scanning of the frequency spectrum in both an up and down direction so that the carrier frequency may be approached from above and below. Prior art circuits which include a piezoelectric crystal of the type which are economically feasible for use in signal seeking receivers do not provide the above described two-way scanning action.

Figure 2:
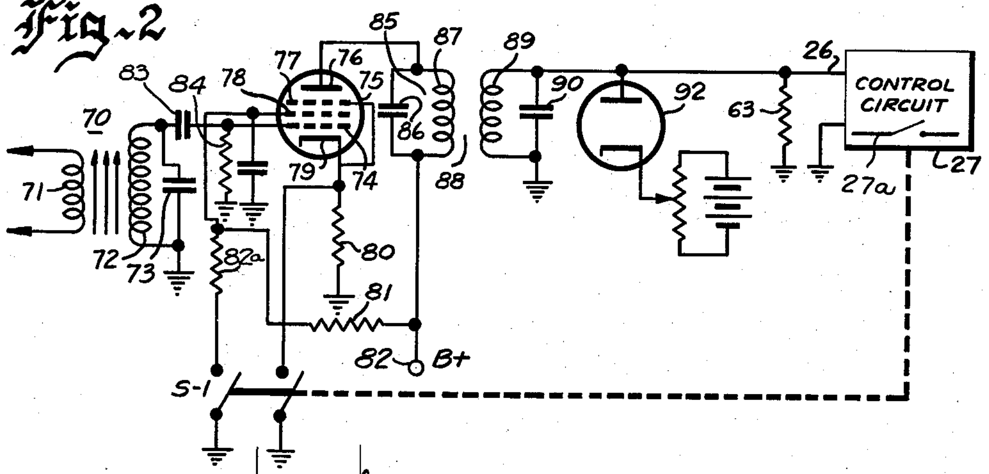
Fig. 2 is an alternative embodiment of the intelligence circuit of the present invention.

While a separate discharge device has been disclosed for use as the limiter 32, it is to be understood that amplitude limiting may be provided by a discharge device which is already present in the receiver. For example, a discharge device in the intermediate frequency amplifier 17 may be suitably operated as a limiter during the signal seeking operation. Such a circuit arrangement is shown in Fig. 2 wherein a first intermediate frequency transformer 70 is provided with a primary winding 71 and a secondary winding 72. These windings are loosely coupled and if desired may be independently adjustably tuned. The output of the converter 12 is connected to the primary winding 71, the secondary winding being tuned by means of a capacitor 73. The IF signal voltage which is thus provided across the secondary winding 72 and the capacitor 73 is coupled to an intermediate frequency amplifier tube 75 between the control electrode 74 thereof and ground. The amplifier 75 is additionally provided with an anode 76, a suppressor electrode 77, a screen electrode 78 and a cathode 79. A cathode resistor 80 is connected in the conventional manner between the cathode 79 and ground.

During normal receiver operation, i.e., when the receiver is not in a signal seeking condition, the cathode 79 is coupled to ground through the cathode resistor 80 and voltage for the screen electrode 78 is supplied from the B+ terminal 82 through a resistor 81. Tube 75 thus operates as an IF amplifier.

The second IF transformer 88 is provided with a secondary winding 89 which is tuned by means of a capacitor 90 and the signal developed thereacross is rectified in the rectifier 92, is produced across the resistor 63 and is supplied over the conductor 26 to the control circuit 27. When the heretofore mentioned switch **27*a* in the control circuit 27 is operated to cause an energization of the scanning motor 14, thereby to commence the signal seeking operation, a switch S–1 is closed so as to connect the cathode 79 to ground and supply voltage to screen electrode 78 through a voltage divider comprising resistors 81 and 82*a*. This change in circuit connection modifies the operating characteristics of tube 75 so that it acts in conjunction with capacitor 83 and resistor 84** as a limiter circuit.

While the invention has been described by means of particular embodiments thereof, it will be understood that those skilled in the art may make many changes and modifications without departing from the invention. Therefore, in the appended claims it is intended to cover all such changes and modifications as fall within the true spirit and scope of this invention.

What is claimed as new and desired to be secured by Letters Patent of the United States is:

1. In a signal seeking receiver, limiting means for deriving from a received signal a voltage of fixed magnitude throughout a predetermined frequency range, a parallel resonant circuit comprising an inductor and a plurality of capacitors serially connected across said inductor, said limiting means comprising a signal translating device in the output circuit of which said resonant circuit is serially connected, detecting means comprising a delay diode, means for providing said diode with a regulated bias voltage, a direct connection between said diode and a junction of said capacitors thereby to supply to said detecting means a portion of the voltage developed across said resonant circuit, and control means responsive to the voltage developed across said detecting means for adjusting the tuning condition of said receiver.

2. In a signal seeking receiver, limiting means for deriving from a received signal a voltage of fixed magnitude throughout a predetermined frequency range; a parallel resonant circuit comprising an inductor and a plurality of capacitors serially connected across said inductor; said limiting means comprising a signal translating device in the output circuit of which said resonant circuit is serially connected; detecting means comprising a diode, means for providing said diode with a regulated bias voltage; a direct connection between said diode and a junction between said capacitors thereby to supply to said detecting means a portion of the voltage developed across said resonant circuit; a direct current amplifier connected to said detecting means so as to be responsive to detected voltages greater than the bias voltage provided for said detecting means; a motor for continuously adjusting the tuning of said receiver; and, a control circuit responsive to the output of said direct current amplifier to stop operation of said motor.

References Cited in the file of this patent

UNITED STATES PATENTS

| | | |
|---|---|---|
| 2,487,772 | Nicholson | Nov. 8, 1949 |
| 2,491,942 | Wiley | Dec. 20, 1949 |
| 2,499,858 | Gull | Mar. 7, 1950 |
| 2,506,869 | Gull | May 9, 1950 |
| 2,584,578 | Gull | Feb. 5, 1952 |
| 2,773,181 | Singel | Dec. 4, 1956 |